United States Patent
Mistry et al.

(10) Patent No.: US 6,202,778 B1
(45) Date of Patent: *Mar. 20, 2001

(54) MOTOR VEHICLE AND A SUMP GUARD AND UNDERTRAY ASSEMBLY THEREFOR

(75) Inventors: Jitesh Dahyabhai Mistry, Rugby; Stephen Richard Cragg, Birmingham; Nicola Kerri Wilkinson, Leamington Spa, all of (GB)

(73) Assignee: Rover Group Limited, Warwick (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/114,653

(22) Filed: Jul. 13, 1998

(30) Foreign Application Priority Data

Jul. 14, 1997 (GB) .................................................. 9714724

(51) Int. Cl.⁷ ..................................................... B62D 25/20
(52) U.S. Cl. ............................................................ 180/69.1
(58) Field of Search ........................... 180/69.1; 280/720; 296/204, 38

(56) References Cited

U.S. PATENT DOCUMENTS

| | | | |
|---|---|---|---|
| 3,651,884 | * | 3/1972 | Dorries ................................ 180/69.1 |
| 3,918,542 | * | 11/1975 | Murillo ............................... 180/69.1 |
| 4,114,717 | * | 9/1978 | Andrews ............................. 180/69.1 |
| 4,129,330 | * | 12/1978 | Schwuchow ........................... 296/38 |
| 4,892,350 | * | 1/1990 | Kijima ................................. 296/204 |
| 5,611,593 | * | 3/1997 | Fukagawa et al. ................... 296/204 |
| 5,797,647 | * | 8/1998 | Mehrkens et al. ................... 296/204 |
| 5,813,491 | * | 9/1998 | Sato et al. ........................... 180/69.1 |

FOREIGN PATENT DOCUMENTS

| | | | |
|---|---|---|---|
| 2817580 | * | 11/1978 | (DE) ................................... 180/69.1 |
| 33 46 421 A1 | | 7/1985 | (DE) . |
| 93 02 419 | | 6/1993 | (DE) . |
| 195 21 632 A1 | | 12/1996 | (DE) . |
| 195 34 972 A1 | | 3/1997 | (DE) . |
| 0 346 237 A1 | | 12/1989 | (EP) . |

OTHER PUBLICATIONS

Japanese Abstract, vol. 7, No. 59 (M–199) dated Mar. 11, 1983 & JP 57 2052228A (Nissan) dated Dec. 16, 1982.

* cited by examiner

Primary Examiner—Lanna Mai
Assistant Examiner—Toan To
(74) Attorney, Agent, or Firm—Davis and Bujold

(57) ABSTRACT

A motor vehicle having a sump guard and an undertray assembly attached to the undercarriage of the motor vehicle for protection of the undercarriage and engine. The undertray is made from a resilient plastics material and is moveably connected to part of the body structure of the motor vehicle and is allowed to deflect upwardly when impacted from below by an obstacle. Because of resilient nature of the undertray assembly, the undertray assembly disperses an impact load when applied thereto.

8 Claims, 2 Drawing Sheets

MOTOR VEHICLE AND A SUMP GUARD AND UNDERTRAY ASSEMBLY THEREFOR

FIELD OF THE INVENTION

This invention relates to a motor vehicle and in particular to a sump guard and undertray assembly for a motor vehicle.

BACKGROUND OF THE INVENTION

It is known to provide a sump guard assembly for a motor vehicle that comprises of a rigid plate-like member that is rigidly connected by means of rigid brackets to part of the body structure of the motor vehicle. The purpose of such a sump guard assembly is to prevent or reduce the consequence of an impact between an object lying on the ground and the lower end of the engine assembly in circumstances where the ground clearance is insufficient to allow the engine to pass thereover without contact.

It is a problem with such prior art sump guard assemblies that they further reduce the available ground clearance of the motor vehicle which can be a problem if the vehicle is driven along a deeply rutted road or in deep snow. This is because the sump guard tends to lift the front end of the vehicle away from the road surface thereby reducing the load on the front wheels which both affects steering of the motor vehicle and also if the vehicle is a front wheel drive or four wheel drive vehicle the available traction from the front wheels.

Although such problems are not too serious with a vehicle intended primarily for off-road or agricultural use in which a very large ground clearance can be provided it is a problem when a vehicle is intended for both on-road and off-road use as the handling of the motor vehicle is adversely affected by a large ground clearance.

It is an object of this invention to overcome the problems associated with the prior art.

SUMMARY OF THE INVENTION

According to a first aspect of the invention there is provided a motor vehicle having a body structure defining at least a passenger compartment and an engine compartment, an engine mounted within the engine compartment and an undertray connected to part of the body structure to at least partly cover the lower surface of the engine compartment wherein said undertray is attached to part of the motor vehicle body structure by two or more flexible connections so as to allow relative motion therebetween if the undertray is subjected to an applied load from below.

The undertray may be made from a resilient material and preferably may be made from a resilient plastics material.

The undertray may be connected to the body structure by means of at least one Z-shaped bracket.

Preferably there are two Z-shaped brackets attached near to a rear edge of the undertray.

Advantageously the attachment means used to connect the Z-shaped brackets to the undertray is such as to allow relative movement between the Z-shaped brackets and the undertray when the undertray is subjected to an applied load.

The undertray may have two apertures therein through each of which extends a fastening means used to secure the Z-shaped brackets to the undertray. Preferably the apertures in the undertray are considerably larger than the fastening means that extends therethrough so as to permit relative movement between the undertray and the Z-shaped brackets when the undertray is subjected to an impact.

The Z-shaped brackets may be used to connect a rear end of the undertray to the body structure of the motor vehicle.

Preferably the undertray is connected to part of the body structure of the motor vehicle on each side by a plastic mounting bracket.

Advantageously each of said plastic mounting brackets is sufficiently flexible lo be elastically deformed when the undertray is subject to an applied load from below.

The undertray may be a substantially planar structure having a relatively smooth underside in which case the undertray may have a number of ridges formed therein to increase its stiffness.

The motor vehicle may also be provided with a sump guard rigidly attached to part of the body structure of the vehicle the sump guard being U-shaped having a transversely extending front cross member and two side rails.

The sump guard may be used to attach the undertray to the motor vehicle.

According to a second aspect of the vehicle there is provided a sump guard and undertray assembly for a motor vehicle the assembly having a rigid sump guard member for rigid connection in use to part of the body structure of the motor vehicle and a moveable undertray attached to the sump guard.

The sump guard may have a rigid cross member and two spaced apart side rails to form a U-shaped member into which the undertray is fitted.

The undertray may be connected at a front edge to the cross member and may have one or more flexible brackets at a rear edge to connect it in use to part of the body structure of the motor vehicle.

The undertray may be made from a resilient plastics material.

The shape of the undertray may be such that it forms a plastic hinge in the region of its position of attachment to the front cross member of the sump guard.

BRIEF DESCRIPTION OF THE DRAWINGS

The invention will now be described by way of example with reference to the accompanying drawings of which:

FIG. 3 is a cross section through part of the undertray shown in FIG. 2 showing on an enlarged scale the means of attachment of a Z-shaped bracket to the undertray.

DESCRIPTION OF THE PREFERRED EMBODIMENTS

Figure 1:
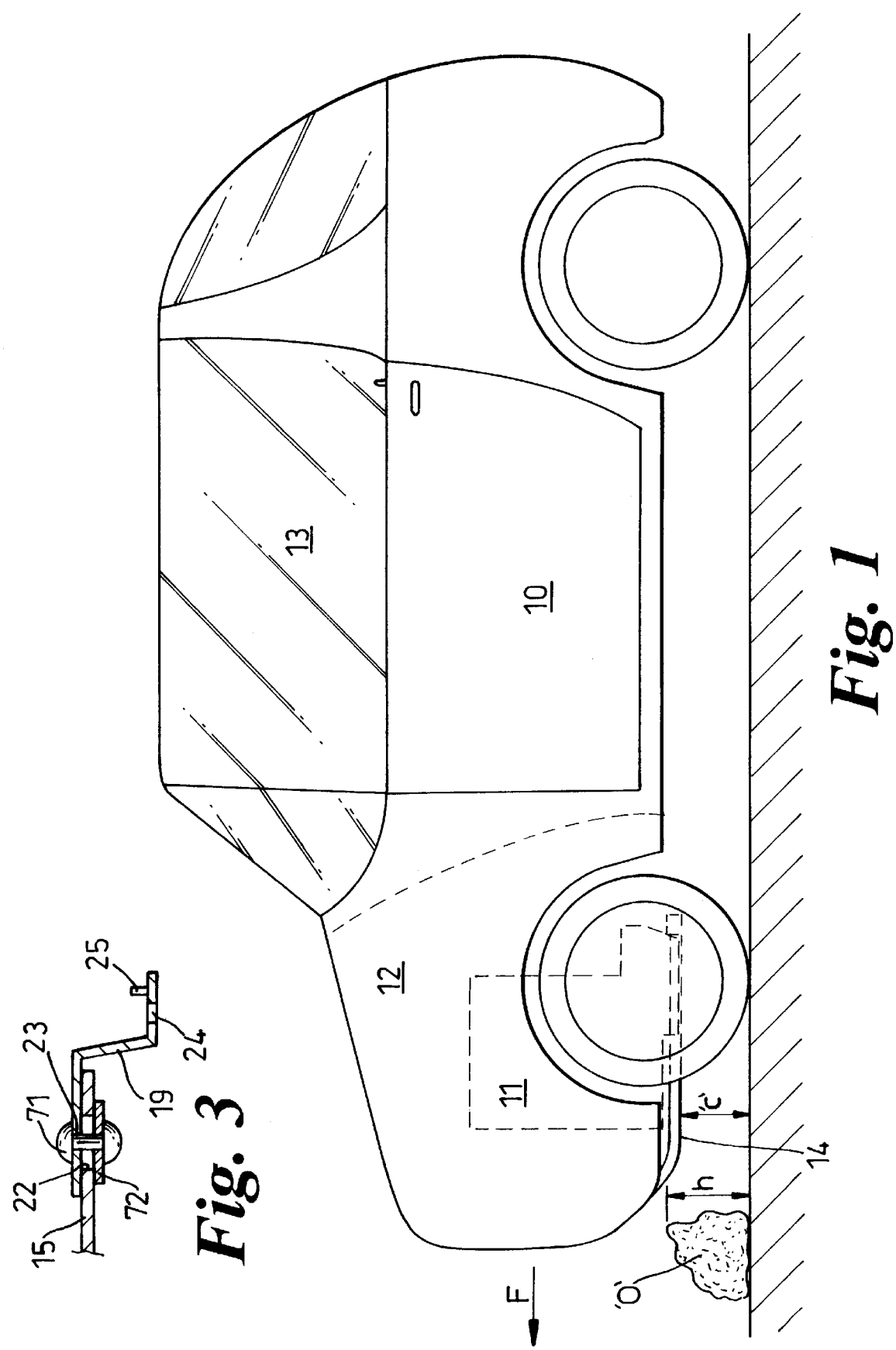
FIG. 1 is a side view of a motor vehicle according to said first aspect of the invention.
Figure 2:
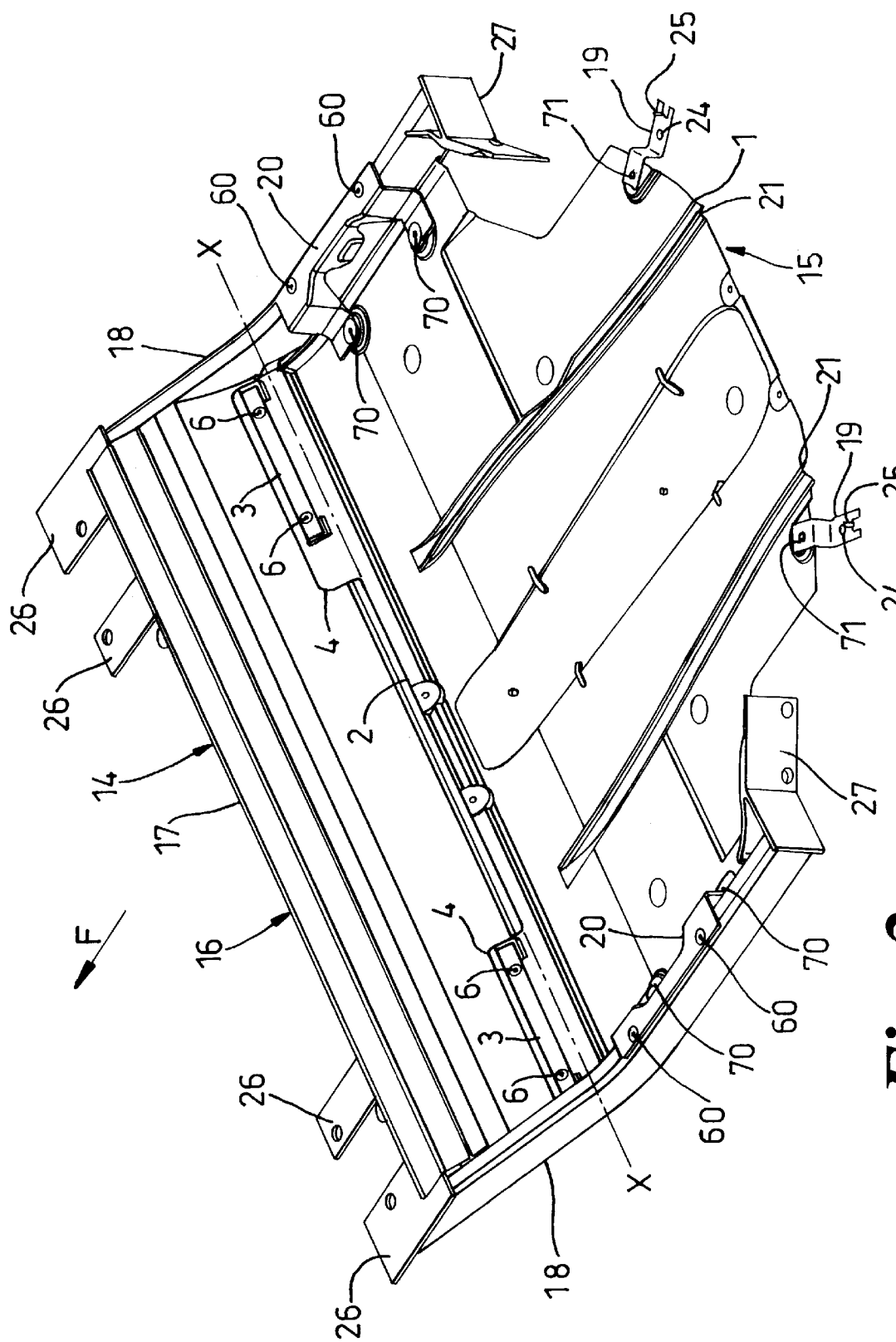
FIG. 2 is a pictorial representation of a sump guard and undertray assembly according to a second aspect of the invention.

With reference to FIGS. 1 to 3 there is shown a motor vehicle 10 having an engine compartment 12, passenger compartment 13 and an engine 11 mounted in the engine compartment 12.

The lower end of the engine 11 is protected by a sump and undertray assembly 14.

The sump and undertray assembly 14 comprises of an undertray 15 and a sump guard 16.

The sump guard 16 comprises of a transverse aluminium cross member 17 and two extruded aluminium side rails 18. The sump guard 16 is connected at its front edge to part of the body structure of the vehicle by means of a number of plates 26 attached to the side rails 18 and the cross member 17 each of which has an aperture therein to accommodate a fastener used to fasten the sump guard 16 to part of the body structure of the motor vehicle.

The rear end of each side rail 18 has a plate 27 attached thereto for fixing the rear end of the sump guard 16 to part of the body structure of the motor vehicle. The plates 27 having two apertures therein to accommodate fastening means used to fasten the rear end of the sump guard 16 to part of the body structure of the motor vehicle.

The undertray 15 is attached at a front end to the cross member 17 by means of pop rivets 6 and is reinforced in the region of the rivets 6 by a metal strip 3. The front edge of the undertray 15 has two tabs 4 extending therefrom which are used to fasten the undertray 15 to the cross member 17. The combination of the reinforcing strips 3 and the tabs 4 is such that the connection between the cross member 17 and the undertray 15 causes the undertray to act as a pair of spaced apart plastic hinges on common hinge axis XX. The rear edge 1 of the undertray 15 can therefore pivot about the hinge axis XX.

Each side of the undertray 15 is connected to the adjacent side rail 18 by means of a flexible plastic bracket 20. The flexible brackets 20 are connected to the side rails 18 by means of pop rivets 60 and to the undertray by means of pop rivets 70. The flexible plastic brackets 20 allow the undertray 15 to move relative to the side rails 18 when the undertray is subjected to an impact from below and are also sufficiently flexible to accommodate any flexing of the undertray that may occur.

The rear edge 1 of the undertray is secured directly to part of the body structure of the motor vehicle 10 by means of a pair of spring steel Z-shaped brackets 19. The brackets 19 each have a first aperture 23 used to connect the bracket 19 to the undertray 15 and a second aperture 24 used to accommodate a bolt used to connect the bracket to part of the body structure of the motor vehicle 10. Adjacent to the second apertures there is formed an upturned tab 25 which is used to align the bracket 19 with a threaded fixing held captive on part of the body structure of the motor vehicle 10.

The brackets 19 are secured to the undertray 15 by rivets 71. Each of the rivets 71 extends through the aperture 23 in the bracket 19, an aperture 22 in the undertray 15 and through a washer 72 placed on the lower surface of the undertray 15.

The aperture 22 in the undertray 15 is much larger than the diameter of the rivet 71 that extends therethrough. To allow the undertray to slide relative to the bracket 19 when it is subjected to an impact. However in normal conditions the clamping force of the rivets 71 is sufficient to hold the undertray securely to each of the brackets 19.

Although the undertray 15 is a substantially planar object a pair of spaced apart corrugations 21 are formed therein extending from the rear edge 1 of the undertray towards the front edge 2 of the undertray. The corrugations 21 increase the stiffness to bending in a foreaft direction but have very little effect on the resistance to bending of the undertray in the transverse direction. This enables the undertray to remain very flexible while having sufficient stiffness to resist resonance which is a common problem with large flat surfaces when they are subject to vibration.

The undertray 15 is made from a glass moulded thermoplastic having a polypropylene matrix in which is embedded random glass fibres. This material provides a very good resistance to impact while having sufficient flexibility and resilience to resist impact without cracking.

In use the undertray assembly 14 operates in the following manner, if the vehicle drives in a forward direction 'F' over an obstacle 'O' such as a rock or boulder the vertical height 'h' of which is greater than the ground clearance 'c' of the motor vehicle 10 then contact will occur between the cross member 17 and the upper edge of the object 'O'. The inclined nature of the front cross member 17 will cause it to ride up over the obstacle 'O' causing an upward displacement of the front portion of the motor vehicle 10 and thus an increase in the instantaneous or dynamic ground clearance of the motor vehicle. After the front cross member 17 has passed over the obstacle 'O' the obstacle 'O' will come into contact with the undertray 15 but because of the flexible and substantially planar nature of the undertray 15 the vehicle will tend to slide across the obstacle 'O'. The undertray 15 is deflected upwardly by the impact with the obstacle 'O' against the resistance provided by the flexible brackets 20 and the Z-shaped brackets 19 until it contacts the lower end of the engine 11. The resilient nature of the undertray is such that, even if the undertray 15 is forced against the lower end of the engine 11 by the obstacle 'O', it acts so as to disperse any impact force applied by the obstacle 'O' to the lower end of the engine 11 thereby minimising any damage that may occur.

Such displacement of the undertray is absorbed by the flexible brackets 20 and the Z-shaped brackets 19.

After the vehicle has passed over the obstacle the inherent resilience and flexibility of the brackets 19, 20 will restore the undertray 15 to its original position.

It can therefore be seen that the undertray 15 enables the vehicle to ride over in a "sledge-like" fashion obstacles upon which it could become grounded if the undertray was of a rigid nature and fixed rigidly to the motor vehicle 10. In addition the generally planar nature of the undertray is beneficial in that it provides a clean aerodynamic surface to the underside of the engine compartment area thereby reducing the drag co-efficient of the motor vehicle. By using a resilient material such as glass moulded thermoplastic the undertray also acts as an acoustic dampener preventing noise from propagating from the lower end of the engine compartment.

It will also be appreciated by those skilled in the art that with a conventional rigid sump and undertray construction a considerable clearance is normally provided between the lower end of the engine and the sump or undertray assembly. This is to ensure that normal vertical deflections of the engine upon its mountings do not cause contact to occur between the sump and undertray assembly and the lower end of the engine. However this additional clearance can be a disadvantage when the vehicle is driving along a deeply rutted road as the sump guard and undertray assembly has effectively reduced the available ground clearance of the motor vehicle. With a sump and undertray assembly according to the invention the sump guard need only be as deep as the lower end of the engine so that it does not in fact reduce the ground clearance at all. The undertray may however project further down during normal use so as to provide the necessary clearance between the engine and the undertray but upon contact with the upper surface of a rut in the road the undertray is easily pushed upwardly thereby reducing the risk of the vehicle grounding on the top of the road surface between the ruts.

It will also be appreciated that while the invention has been described as a sump guard it is equally effective at protecting other vulnerable components such as gearbox housings or differential housings.

We claim:

1. A motor vehicle comprising:

a body structure which defines at least a passenger compartment and an engine compartment, the engine compartment having a lower surface and the body structure having a lower portion and a front portion;

an engine mounted within the engine compartment; and a sump guard and undertray assembly connected to said lower portion to at least partly cover said lower surface;

wherein the sump guard and undertray assembly has a rigid sump guard member rigidly connected to the front portion of the body structure, and an undertray having a front portion which is hingedly connected to the sump guard member along a transverse hinge axis and a rear portion which has two first apertures therethrough and is connected to the lower portion of the body structure by at least two connections, each connection comprises a bracket having a second aperture therethrough and a rivet passing through one of the first apertures and one of the second apertures, and the first aperture have a sufficiently large diameter to permit sliding movement between the undertray and the brackets thereby to allow relative motion between the undertray and the body structure when the undertray is subjected to a load applied from below the motor vehicle.

2. The motor vehicle as claimed in claim 1, wherein each of the brackets is Z-shaped.

3. The motor vehicle as claimed in claim 1, wherein the sump guard member is U-shaped and has a transversely extending front cross member and two side rails.

4. The motor vehicle as claimed in claim 3, wherein the undertray is further connected on each opposed side to one of the side rails by a flexible mounting bracket.

5. The motor vehicle as claimed in claim 4, wherein each of said flexible mounting brackets is made from a plastics material so as to allow said flexible mounting brackets to be elastically deformed when the undertray is subject to a load applied from below the vehicle without sustaining permanent distortion.

6. The motor vehicle as claimed in claim 1, wherein the undertray is a substantially planar structure having a relatively smooth underside.

7. The motor vehicle as claimed in claim 6, wherein the undertray has a number of lengthwise extending corrugations formed therein to increase a stiffness of the undertray.

8. The motor vehicle according to claim 1, wherein the undertray has two tabs which form plastic hinges which hingedly connect the undertray to the sump guard member.

* * * * *